United States Patent [19]
Bossler

[11] Patent Number: 5,167,286
[45] Date of Patent: Dec. 1, 1992

[54] DISC HARROW IMPLEMENT

[76] Inventor: John Bossler, 438 Maple St., O'Fallon, Ill. 62269

[21] Appl. No.: 720,247

[22] Filed: Jun. 24, 1991

[51] Int. Cl.$^5$ .................. A01B 63/16; A01B 63/10
[52] U.S. Cl. .................. 172/414; 172/310; 172/395; 172/466
[58] Field of Search ............ 172/310, 327, 328, 414, 172/466, 491, 501–503, 395, 400; 280/414.5

[56] References Cited

U.S. PATENT DOCUMENTS

| | | | |
|---|---|---|---|
| 2,481,017 | 9/1949 | Johnson | 172/466 |
| 2,692,542 | 10/1954 | Bell | 172/503 |
| 2,704,021 | 3/1955 | Brundage | 172/466 |
| 2,767,538 | 10/1956 | Scheidenhelm | 172/328 |
| 2,768,609 | 10/1956 | Oehler et al. | 172/466 |
| 2,797,542 | 7/1957 | Webster et al. | 172/466 X |
| 2,840,971 | 7/1958 | Greeson | 172/466 X |
| 2,952,472 | 9/1960 | McNeill | 172/466 |
| 2,960,346 | 11/1960 | Hunter | 172/414 |
| 2,970,656 | 2/1961 | Kampe | 172/466 |
| 3,195,652 | 7/1965 | Murray et al. | 172/414 |
| 3,643,745 | 2/1972 | Betulius et al. | 172/466 |
| 3,809,165 | 5/1974 | Miller | 172/328 |
| 3,878,901 | 4/1975 | Robertson, Sr. | 172/466 |
| 3,912,017 | 10/1975 | Rehn | 172/328 |
| 4,306,732 | 12/1981 | Pettibone | 172/327 |

Primary Examiner—Randolph A. Reese
Assistant Examiner—Spencer Warnick
Attorney, Agent, or Firm—Gravely, Lieder & Woodruff

[57] ABSTRACT

A disc harrow implement having a wheel supported frame to carry the gang discs for transport over-the-road operating mechanism in the frame to selectively extend the wheels and to retract the wheels during ground discing, a shiftable bar to support a fluid pressure motor connected to the wheels, and a transport link that cooperates with the shiftable bar and the wheel supports to allow the implement to be converted between transport configuration and ground discing configuration.

6 Claims, 3 Drawing Sheets

DISC HARROW IMPLEMENT

BACKGROUND OF THE INVENTION

1. Field of the Invention

This invention is directed to a disc harrow implement having a setting for tilling the soil in preparation for planting or other purposes, and a setting for transporting the implement when tillage is not intended.

2. Description of the prior art

The disc harrow is an old and well-known type of farm implement for preparing a field for planting. In recent times, the implement has been adapted for transportation in a non-operative position. However, the mechanism that is associated with converting the implement from discing to transport is complicated due to the thought that the harrow frame had to be leveled when disking and also when transporting. The prior art that appears to best disclose the leveling mechanism includes Scheidenhelm U.S. Pat. No. 2,767,538 of Oct. 23, 1956 and Brundage et. al. U.S. Pat. No. 3,912,018 of Oct. 14, 1975

A problem observed in prior art harrows is that the hydraulic unit needs to be pressurized continuously in order to allow the harrow frame to remain substantially level.

SUMMARY OF THE INVENTION

It is an object of the invention to provide a simple arrangement of apparatus for conditioning a disc harrow implement to assume a position for transport or a position with the discs in ground working contact with minimum working parts to accomplish the same.

A further object of the invention is to overcome the problems present in the older disc harrow implements by relieving the hydraulic means of constant pressurization, thereby allowing the implement to float with the discs in ground contact and the transport wheels free to float over the ground.

A further object of the invention is to provide the harrow implement with a system of fluid pressure means that is selective to render the implement capable of being transported or capable of performing its ground discing function with the transport wheels free to float and follow the ground contour.

Other objects will appear from the detailed description to follow.

BRIEF DESCRIPTION OF THE DRAWINGS

A preferred embodiment of the disc harrow is disclosed in the following drawings, wherein:

FIG. 3 is a fragmentary section view of a portion of the implement construction taken along line 3—3 in FIG. 2, but on a larger scale;

DETAILED DESCRIPTION OF THE IMPLEMENT

Figure 1:
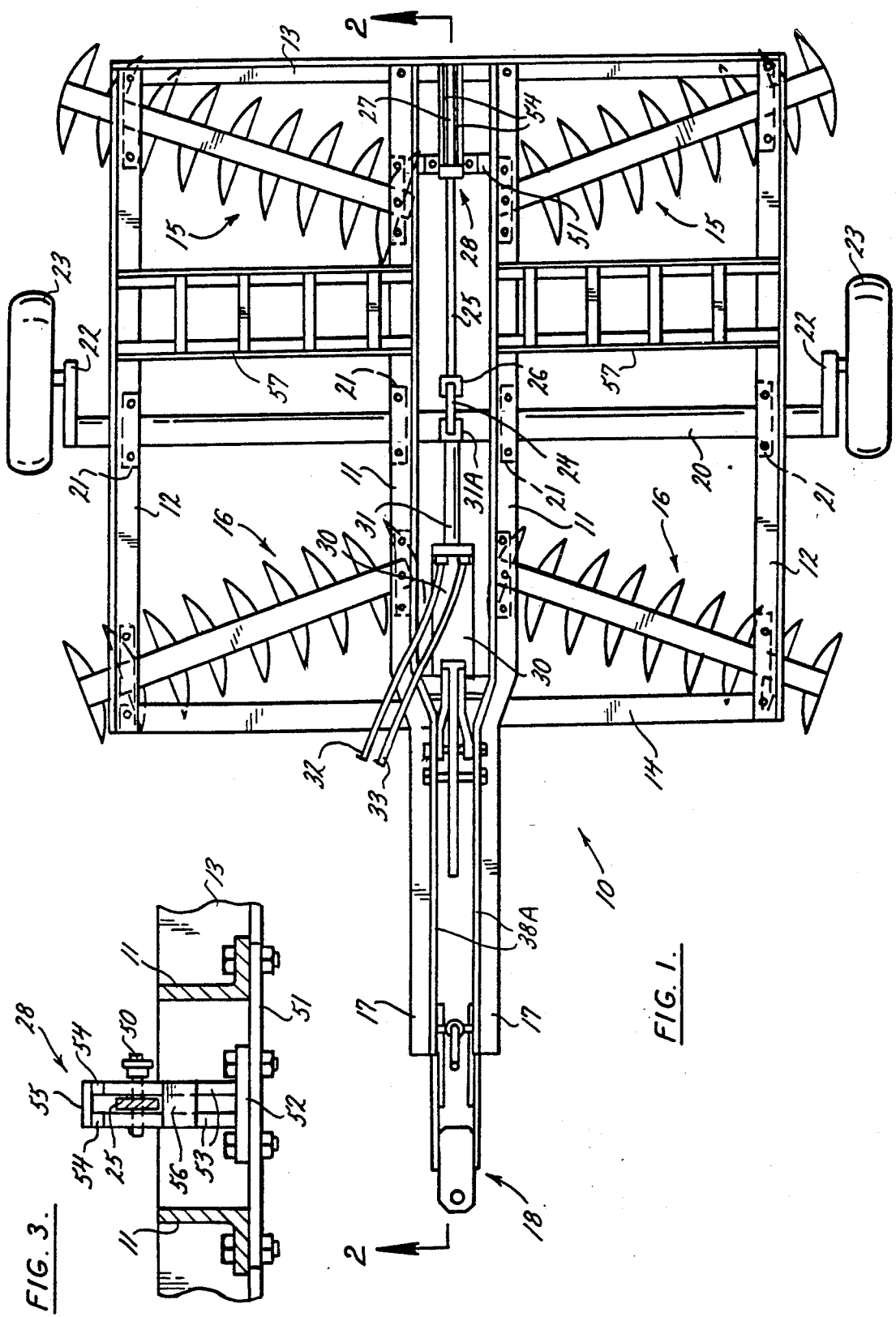
FIG. 1 is a plan view of a disc harrow implement having certain operating components in a first position for permitting transport of the implement.
Figure 2:
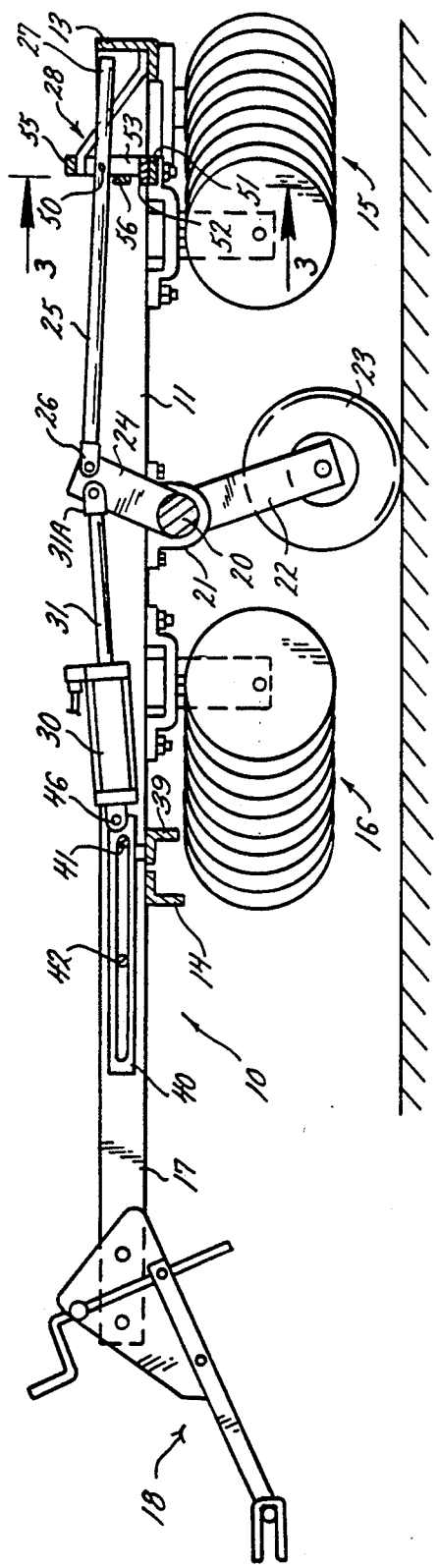
FIG. 2 is a longitudinal view partly in section of operative components for the implement when in transport position, the view being taken along line 2—2 in FIG. 1.

The harrow implement seen in FIGS. 1 and 2 has a frame 10 having a pair of angle iron members 11 forming a central longitudinal beam, lateral framing members 12, a rear frame member 13 which carries the rear ends of the central beam members 11, and front frame member 14 which supports an intermediate portion of the central beam members 11. The frame carries a pair of transverse gang disc assemblies 15 along the rear of the frame. A similar second pair of gang disc assemblies 16 are positioned adjacent the front of the frame. The forward ends 17 of the central beam members 11 are attached to a suitable hitch assembly 18 to connect to a tractor (not shown). The harrow frame 10 is shown in a position so that the gang discs 15 and 16 are in cultivating positions, and the whole assembly moves to follow the contour of the ground.

The improvement in the harrow implement consists in the addition of an axle 20 carried in suitable bearings 21 at the respective frame members 11 and 12. The opposite ends of the axle carry trailing arms 22 to support the spindles for the wheels 23. The axle 20 is provided with a crank arm 24 (See FIG. 2) which line up in the space between the angle members 11 which form the central longitudinal beam of the harrow frame 10. The axle is free to be turned by rotating by the crank arm 24 which turns the wheels 23 to rest on the ground concurrently with the discs raised off the ground. In that condition, the crank arm 24 will incline rearwardly of a vertical position as seen in FIG. 2.

If the harrow implement, as seen in FIGS. 1 and 2 is to be capable of travel with the discs raised, it will be necessary to provide a transport link 25 having a fixed length between its forward end represented by clevis 26 connected to the crank arm 24 and its trailing end 27 which is anchored to a suitable rear frame bracket assembly 28 seen in greater detail in FIG. 3. The length of the link 25 is selected so that the crank arm 24 is pulled back to rotate the axle 20 in the direction to elevate the frame 10 by swinging the trailing arms 22 down which transfers the weight of the frame 10 and the gang discs 15 and 16 onto the wheels 23. Thus, the link 25 when connected to the bracket assembly 28 will hold the harrow in its raised transport position.

The improvement in the harrow also comprises a fluid powered cylinder 30 and piston rod 31 positioned in the space between the central angle iron members 11. (See FIGS. 1 and 4) The piston rod 31 extends rearwardly of the cylinder 30 and is connected to the axle crank arm 24 at clevis 31A. The cylinder 30 is double acting and has a source of pressure fluid (available on the tractor—not shown) connected by two hoses 32 and 33. The source of the pressure fluid is at the tractor and is subject to a control (not shown) which directs the pressure fluid to either hose 32 or 33 while allowing the non-functioning hose to return the fluid to the source.

Figure 4:
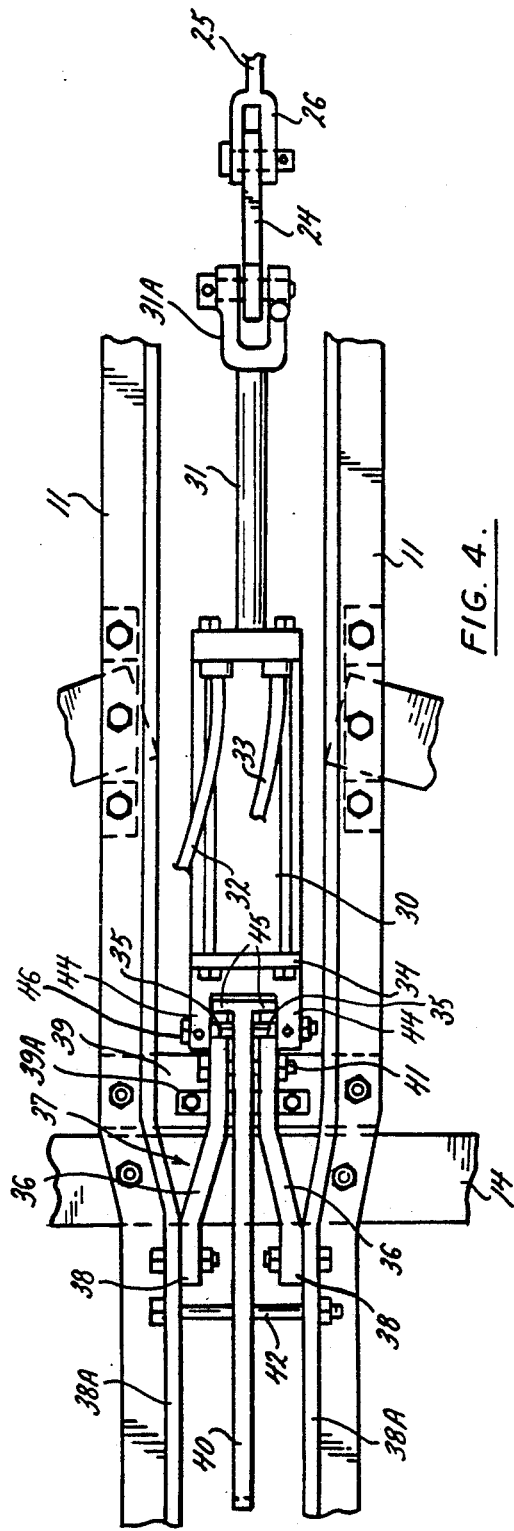
FIG. 4 is a fragmentary plan view of a further portion of the implement construction seen in FIG. 1 but on a larger scale to show details.
Figure 7:
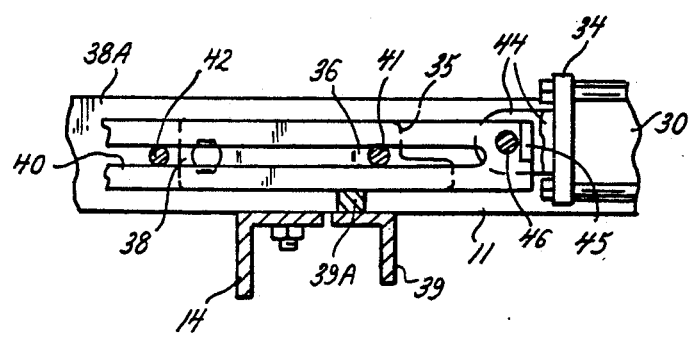
FIG. 7 is a fragmentary sectional view on an enlarged scale of the slotted guide and cylinder depicted in FIG. 6.

When the link 25 is connected to the rear bracket 28, the piston rod 31 is rendered inoperative because the axle crank arm 24 is held against moving by the link 25. However, by applying pressure fluid through hose 33, the cylinder 30 will be moved away from the axle crank arm 24 until its closed end 34 reaches a position against stop shoulder 35 formed in the adjacent ends 36 of a wishbone bracket 37. See FIG. 7 for the stop shoulder 35. The opposite ends 38 of the wishbone 37 are fastened to the vertical flange 38A of the central longitudinal members 11. The wishbone 37 is supported on a block 39A fastened to the flange 39 which is, in turn, fastened to the members 11. This structural assembly is seen in FIGS. 4 and 7.

Figure 5:
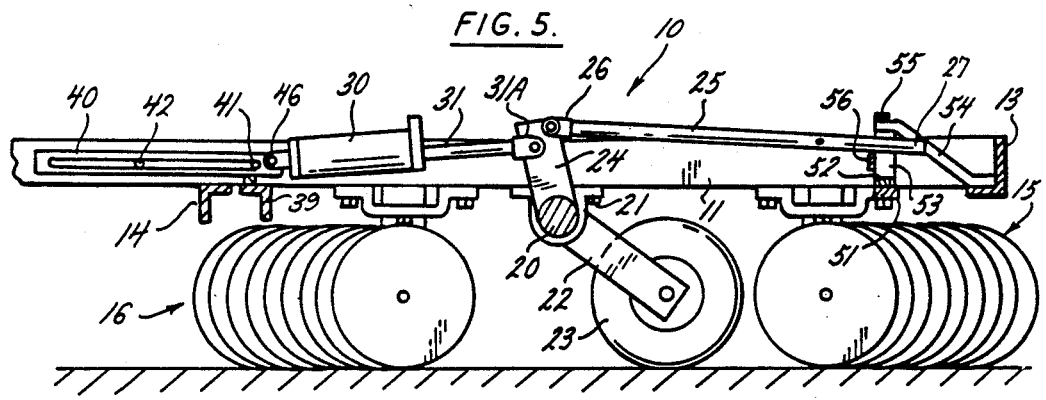
FIG. 5 is a longitudinal side elevation view of the implement in a setting for the discs to perform their tillage function.
Figure 6:
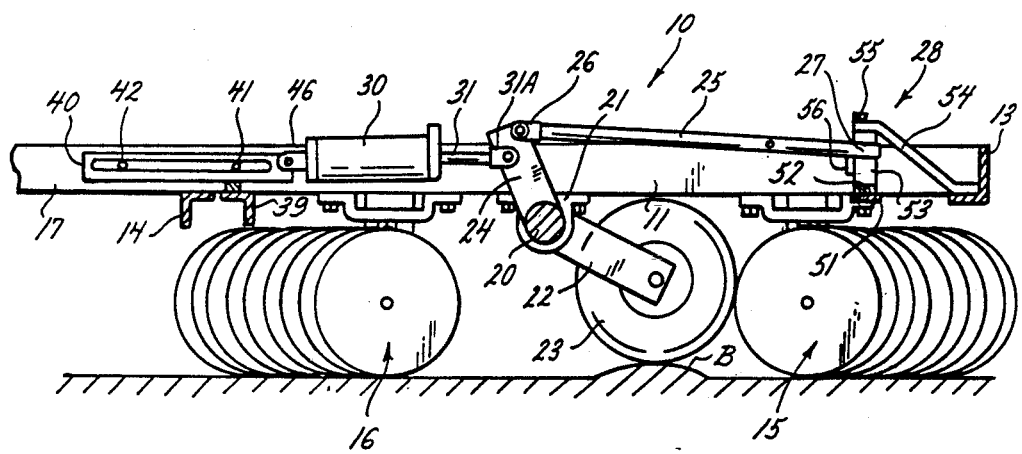
FIG. 6 is a longitudinal side elevation view of the implement in a setting for permitting the implement to float.

When the link 25 is disconnected at its end 27 from the bracket assembly 28 (see FIGS. 5 and 6), the cylinder 30 and piston rod 31 are free to move or float in response to the motion of wheels 23 following the ground contour because the closed end 34 of the cylinder 30 is pivotally connected and supported on a longitudinally slotted guide bar 40 carried by a spaced pair of bolts 41 and 42 (see FIG. 6). The slotted guide bar 40 moves relative to a first bolt 41 mounted in the wishbone 37 (see FIGS. 4 and 7) adjacent stop shoulder 35, and a second bolt 42 carried in flanges 38A of members 11 spaced beyond the ends 38 of the wishbone bracket 37. The two bolts 41 and 42 maintain the guide bar 40 moving in a straight line which allows the cylinder 30 and piston 31 to float in response to the ground contour traversed by the wheels 23 during disc cultivation.

The closed end 34 of cylinder 30 has projections 44 spaced apart so they can slide past the stop shoulders 35 until the bolt or pin 46 carried in the space projections 44 (FIGS. 4 and 7) abuts the shoulders 35 on the wishbone 37. The arrangement of block elements 45 on the guide 40 function to keep the cylinder 30 from getting out of alignment with the wishbone 37.

In view of FIG. 5, the link 25 has been released by removing a retainer pin 50 which has locked the link 25 to the bracket 28. The removal of pin 50 allows the cylinder 30 to actuate piston rod 31 to swing the arm 24 in a counter clockwise direction to raise the transport wheels 23 and allow the frame 10 and gang discs 15 and 16 to lower so the discs engage the ground for tillage.

In the view of FIG. 6, the piston 30 and piston rod 31, together with the slotted guide bar 40 are movable to float in the frame 14 while the gang discs are engaged on the ground. Thus, the transport wheels 23 are fee to rise and fall in following the ground contour, such as a bump B. The uniqueness of this arrangement resides in the continual support of the cylinder 30 by the slotted guide bar 40, while the transport link, 25 slides relative to the bracket assembly 28.

Turning now to FIGS. 1 and 3, it is seen that the central member 11 extends to ends connected to the near frame member 13. Spaced inwardly from member 13 is a support strap 51 fastened to the members 11 for the support of a bracket base 52 which includes vertical elements 53. The upper ends of the elements 53 are each braced by an angularly directed element 54 (see FIG. 5), and the upper ends of these elements 54 are connected by a cap piece 55 so that the vertical elements are retained in spaced positions of sufficient dimension to allow the easy passage of the end of the transport link 25 while that end is slidably supported on a fixed track piece 56 spanning the spacing between the vertical elements 53. As seen in FIG. 2, when the transport link 25 is fixed in the bracket assembly 28 by the retainer pin 50, it is held elevated from the track piece 56.

A unique characteristic of the implement resides in the ability to control the fluid pressure supplied by hose 32 to have the piston pull the axle crank arm 24 for lifting the ground wheels 23, more or less, depending on how deep the discs need to go in tilling the soil. If additional weight is required, because of ground hardness, the frame 10 is provided with rack means 57 (See FIG. 1) to carry blocks (not shown) of the desired total weight required.

What is claimed is:

1. In a disc harrow implement for selective ground cultivating and for transport without ground cultivation, the improvement comprising:
   (a) a frame and discs thereon for ground cultivation;
   (b) wheel means movably carried on said frame for movement between a first position lifting said frame with said discs out of ground cultivating contact and a second position lowering said frame with said discs thereon in ground cultivating contact;
   (c) first means on said frame for releasibly holding said wheel means in said first position;
   (d) control means on said frame having a connection with said wheel means for moving said wheel means into said second position following release of said first means; and
   (e) second means on said frame in contact with said control means for simultaneously supporting said control means and permitting said control means to move between a fixed position to retain said wheel means in said first position and a second position responsive to said wheel means while in said second position so that said wheel means is able to follow the contour of the ground to be cultivated, said second means including a slotted guide bar supported in the frame and connected to said control means to allow for sliding movement of said control means.

2. The improvement set forth in claim 1 wherein said control means includes a pressure fluid cylinder means, crank means connected between said cylinder means and said wheel means, and said first means is a link means connected to said crank means and releasibly secured in said frame for holding said wheel means in said first position.

3. In a disc harrow implement for selective ground cultivation and transport while out of ground cultivation, the improvement comprising:
   (a) a frame with cultivating discs and a rotary shaft thereon, said frame having lateral side frame members and a rear frame member;
   (b) wheel means connected to said rotary shaft and movable in response to rotation of said rotary shaft to a first position elevating said frame and to a second position for lowering said frame to place said discs in ground cultivating position;
   (c) cylinder and piston rod means positioned in said frame;
   (d) crank means on said rotary shaft connected to said piston rod means, said crank means supporting said cylinder from the rotary shaft;
   (e) bracket means positioned adjacent said rear frame member in alignment with said crank means;
   (f) elongated bar means having one end connected to said cylinder and having an elongated slot therein and being slidably carried by said frame to support said cylinder in position to float in said frame on said elongated bar means and effect rotation of said rotary shaft through said crank means to position said wheel means in said first position to support said frame; and (g) link means having a pivotal end and an opposite slidable end, said link means being positionable in said frame and having a predetermined length for holding said piston rod means in a position to fix said crank means with said frame in said first position.

4. In a disc harrow implement having a frame for the carriage of soil cultivating discs thereon, and transport wheels on the frame to enable movement of the harrow with the frame and the discs elevated, the improvement comprising:
  (a) axle means on said frame connected to said transport wheels;
  (b) first means detachably connected to said frame, and also connected to said axle means for holding said axle means with said transport wheels in a position to elevate and support said frame and discs by said wheels; and
  (c) second means including cylinder means and a slotted guide bar supported on said frame and connected to said axle means for allowing said axle means and said transport wheels to float relative to said discs upon the detachment of said first means from said frame so as to allow the discs to cultivate the soil and the wheels to follow the ground contour.

5. The improvement set forth in claim 4 wherein said cylinder means includes a cylinder and piston rod with said cylinder movably supported on said frame and said piston rod connected to said axle means, said cylinder supported on said frame being operative to render said first means easily detachable.

6. The improvement set forth in claim 5 wherein said slotted guide bar is slidable in said frame in a position to maintain support of said cylinder.

* * * * *